(12) United States Patent
Erden (10) Patent No.: US 8,116,024 B2
(45) Date of Patent: Feb. 14, 2012

(54) TIMING RECOVERY DETECTOR

(75) Inventor: Mehmet Fatih Erden, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 169 days.

(21) Appl. No.: 12/538,764

(22) Filed: Aug. 10, 2009

(65) Prior Publication Data

US 2011/0032632 A1 Feb. 10, 2011

(51) Int. Cl.
*G11B 5/09* (2006.01)

(52) U.S. Cl. ..................................... 360/51; G9B/5.033

(58) Field of Classification Search ......................... None
See application file for complete search history.

(56) References Cited

U.S. PATENT DOCUMENTS

| | | | |
|---|---|---|---|
| 4,499,454 A * | 2/1985 | Shimada | 341/58 |
| 5,726,818 A | 3/1998 | Reed et al. | |
| 6,009,549 A | 12/1999 | Bliss et al. | |
| 7,881,459 B2 * | 2/2011 | Wu et al. | 379/406.01 |
| 2007/0168197 A1 * | 7/2007 | Vasilache | 704/503 |

OTHER PUBLICATIONS

T.K. Sarkar et al., "A Tutorial on Wavelets from an Electrical Engineering Perspective, Part 1: Discrete Wavelet Techniques," IEEE Antennas and Propagation Magazine, vol. 40, No. 5, Oct. 1998, pp. 49-70.

* cited by examiner

*Primary Examiner* — Daniell L Negron
(74) *Attorney, Agent, or Firm* — HolzerIPLaw, PC (57) ABSTRACT

A timing detector adapted for timing recovery on a read-channel is disclosed to improve signal quality of an input signal and maintain a small loop latency. The timing detector selects bits within the input signal that are high quality for timing recovery and discards bits that are low quality. The selected bits are used to synchronize phase and frequency of a bit sampler with a read-back analog signal. High-pass and low-pass analysis filters may split the input signal into high-frequency and low-frequency sub-bands and equalizers may re-shape the sub-bands. High-pass and low-pass synthesis filters may construct an output signal from the high-frequency and low-frequency sub-bands. Scaling factors may correct for signal and disturbance variations in the sub-bands. A comparator may eliminate sampled bits within the detector signal that have a magnitude less than a threshold and assign a common magnitude to sampled bits that meet or exceed the threshold.

20 Claims, 9 Drawing Sheets

TIMING RECOVERY DETECTOR

SUMMARY

Implementations described and claimed herein provide a timing detector specifically adapted for timing recovery on a read-channel to improve signal quality of an input signal and maintain a small loop latency. Because the timing detector is specifically adapted for timing recovery rather than detection of all bits within the read-back signal, the timing detector can operate using a relatively low quality input signal. As a result, the timing detector may obtain its input signal directly from the output of an A/D sampler, rather than from other components of the read-channel further downstream from the A/D sampler.

The timing detector uses a simple algorithm(s) that selects bits within the input signal that are high quality for timing recovery and discards bits that are low quality. As a result, while an output signal from the timing detector may not contain all of the bits within the input signal, the output signal may be obtained very quickly (i.e., result in a very small loop latency) and have a very high signal quality. The output signal is then fed into a timing recovery module to synchronize phase and frequency of the A/D sampler with a read-back analog signal.

In one implementation, a high-pass analysis filter and a low-pass analysis filter split an input signal into a high-frequency sub-band and a low-frequency sub-band, respectively. Each sub-band has half the bandwidth of the original input signal. A first equalizer block re-shapes the high-frequency sub-band. With regard to the low-frequency sub-band, another high-pass analysis filter and another low-pass analysis filter are applied again to split the low-frequency sub-band into a high-low-frequency sub-band and a low-low-frequency sub-band, respectively. The two new sub-bands have half the bandwidth of the low-frequency sub-band. A second equalizer block re-shapes the high-low-frequency sub-band and a third equalizer block re-shapes the low-low-frequency sub-band. Alternative configurations resulting in different numbers and/or frequencies of sub-bands may be employed.

A high-pass synthesis filter and a low-pass synthesis filter are used to reconstruct a modified low-frequency sub-band from the high-low-frequency sub-band and the low-low-frequency sub-band, respectively. Another high-pass synthesis filter and another low-pass synthesis filter are again used to combine the high-frequency sub-band and the reconstructed modified low-frequency sub-band to output a detector signal.

In a further implementation, one or more scaling factors are applied to either or both of the synthesis filters to correct for signal and disturbance variations in the sub-bands. In yet another implementation, a comparator utilizes a threshold confidence factor to eliminate sampled bits within the detector signal that have a magnitude less than the threshold confidence factor and assign a common magnitude to sampled bits that meet or exceed the threshold confidence factor.

Other implementations are also described and recited herein.

DETAILED DESCRIPTIONS

In magnetic storage systems for computers, digital data is written onto a surface of a magnetic medium in concentric, radially spaced tracks using a read/write head. When reading the recorded data back from the magnetic medium, the read/write head again passes over the magnetic medium and converts the magnetic transitions into pulses in an analog signal that alternates in polarity. The read-channel circuitry then decodes the pulses to reproduce the digital data.

The demand for increased capacity of magnetic media and increased read/write speed of data to/from magnetic recording media (e.g., hard disk drives, floppy disk drives, and tape drives) has driven increased areal density of magnetic media. Increasing track density (e.g., smaller track width) and/or increasing linear density (e.g., shorter bit lengths along a track) can result in greater areal density on the magnetic recording media. However, as linear density on the magnetic media is increased, data resolution of a signal read-back from the magnetic media typically decreases (i.e., normalized density (ND) increases) and/or a signal-to-noise ratio (SNR) of the read-back signal decreases.

Accurate synchronization of phase and frequency of an analog to digital (A/D) sampler with the phase and frequency of the analog signal read-back from the magnetic media yields a higher ND and lower SNR. Often a timing recovery circuit is implemented within a read-channel architecture to periodically adjust the sampling phase and frequency of the A/D sampler to closely mirror the phase and frequency of the analog signal read-back from the magnetic media.

In one implementation, the A/D sampler detects peaks in the continuous time analog signal generated by the read/write head. The analog read signal is then "segmented" into bit cell periods and "interpreted" during the segments of time. The presence of a positive peak during the bit cell period is detected as a "1" bit and the presence of a negative peak during the bit cell period is detected as a "−1" bit. In another implementation, presence of a positive peak during the bit cell period is detected as a "1" bit and absence of a peak during a bit cell period is detected as a "0" bit. Commonly, errors in detection occur when the bit cells are not correctly aligned with the analog pulse data. Timing recovery adjusts the bit cell periods to synchronize the peaks so that the peaks occur in the center of the bit cells, on average. Synchronization reduces detection errors resulting from misaligned bit cells.

In another implementation, an analog to digital sampler synchronizes pulse samples from the analog signal to a clock signal using a phase-locked loop (PLL). The PLL synchronizes the sampling clock by minimizing errors between sample values of a current analog signal and estimated sample values from a prior analog signal. The PLL iteratively adjusts the clock signal to minimize the errors.

Figure 1:
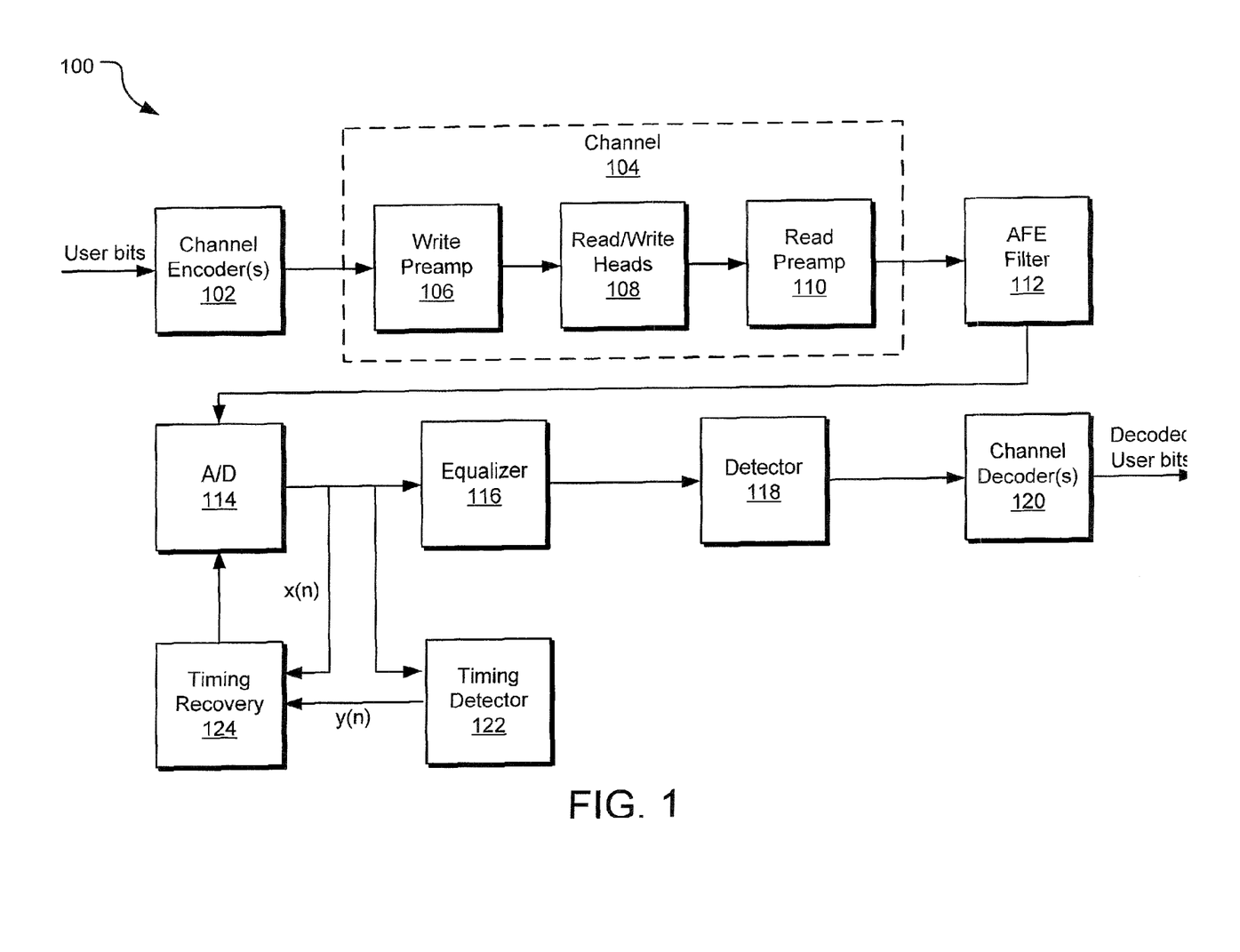
FIG. 1 is an example read-channel architecture with a timing detector dedicated to timing recovery.

FIG. 1 is an example read-channel architecture 100 with a timing detector 122 dedicated to timing recovery. Channel encoder(s) 102 converts bits of data (user bits) to an encoded data stream with a format to be written and read from a magnetic recording media. This information conversion may accomplish a variety of goals (e.g., data standardization, write/read speed, information secrecy, information security, data redundancy, or saving space on the magnetic recording media). The encoded bits of data are then sent to a channel 104 for writing to the magnetic media and reading from the magnetic media.

In the illustrated implementation of the channel 104, writing bits of data to and reading bits of data from the magnetic media includes preparing the encoded data stream for writing to the magnetic media by amplifying the encoded signal using a write preamp 106. Then, read and write heads 108 transfer the encoded data stream to the magnetic media and read the encoded data stream back from the magnetic media. A read preamp 110 prepares the read-back data stream for analysis by amplifying the read-back signal. Other configurations may be employed.

An analog front end (AFE) filter 112 is used to filter out noise from the raw analog signal read-back from the magnetic media. The read-back signal is fed into an A/D sampler 114 that converts the continuous read-back signal to a sequence of instantaneous values at discrete moments of time to yield a discrete signal. In a simulation environment, the conversion of the continuous read-back signal to a sequence of instantaneous values at discrete moments of time is considered perfect (i.e. the A/D sampler is considered an ideal sampler).

An equalizer 116, or equalization filter, is then used to adjust a shape of the discrete signal to a predetermined shape. A detector 118 calibrated to detect data bits within a signal with the predetermined shape detects all the digital data bits within the discrete signal. A channel decoder 120 decodes the detected data bits back into user bits. The decoded user bits are intended to be equal to or nearly equal to the user bits incoming to the channel encoder 102.

In one implementation, a timing recovery module 124 recovers phase and frequency changes in the read-channel architecture 100 and adjusts sampling instances of the A/D sampler 114 to synchronize phase and frequency of the sampling with the read-back analog signal. A failure to accurately synchronize the A/D sampler 114 with the read-back signal increases overall noise within the read-channel architecture 100 and can negatively affect overall performance (e.g., bit-error-rate (BER)) of the magnetic media. Accuracy of the phase and frequency of the synchronization between the A/D sampler 114 and the read-back analog signal is affected by both input signal quality (i.e., read-back signal quality) and loop latency within the timing recovery circuit. As a result, the timing recovery module 124 should be fast and accurate enough to result in high detector BER performance.

The presently disclosed technology utilizes a timing detector 122 specifically adapted for timing recovery to improve the signal quality of an input signal x(n) selected for a small loop latency. Since phase and frequency of the read-channel does not typically vary significantly between individual bits or even small groups of bits, bit detection for timing recovery purposes does not require all bits within the input signal x(n) for bit detection. Because the timing detector 122 is specifically adapted for timing recovery rather than detection of all bits within the read-back signal (i.e., detector 118), the timing detector 122 can operate using a relatively low quality input signal x(n). As a result, the timing detector 122 may obtain its input signal directly from the output of the A/D sampler 114, rather than from the equalizer 116, the detector 118, and/or the channel decoder 120. Therefore, the performance of the timing detector 122 is decoupled from the performance of digital blocks downstream from the A/D sampler 114 (i.e., the equalizer 116, the detector 118, and the channel decoder 120), which reduces loop latency.

The timing detector 122 uses a simple algorithm(s) that only selects bits within the input signal x(n) that are high quality for timing recovery and discard bits that are low quality. As a result, while an output signal y(n) from the timing detector 122 may not contain all of the bits within the input signal x(n), the output signal y(n) may be obtained very quickly (i.e., result in a very small loop latency) and have a very high signal quality. The output signal y(n) is then fed into the timing recovery module 124 and compared with a signal output directly from the A/D sampler 114 to synchronize phase and frequency of the A/D sampler 114 with the read-back analog signal. Since the timing detector 122 is less complex and outputs fewer bit samples than the conventional detector 118, loop latency is reduced when compared to a conventional timing recovery circuit. Further, the timing detector 122 can work at very low SNRs and is not particularly sensitive to media jitter noise because only high quality detected bits are used for timing recovery.

Figure 2:
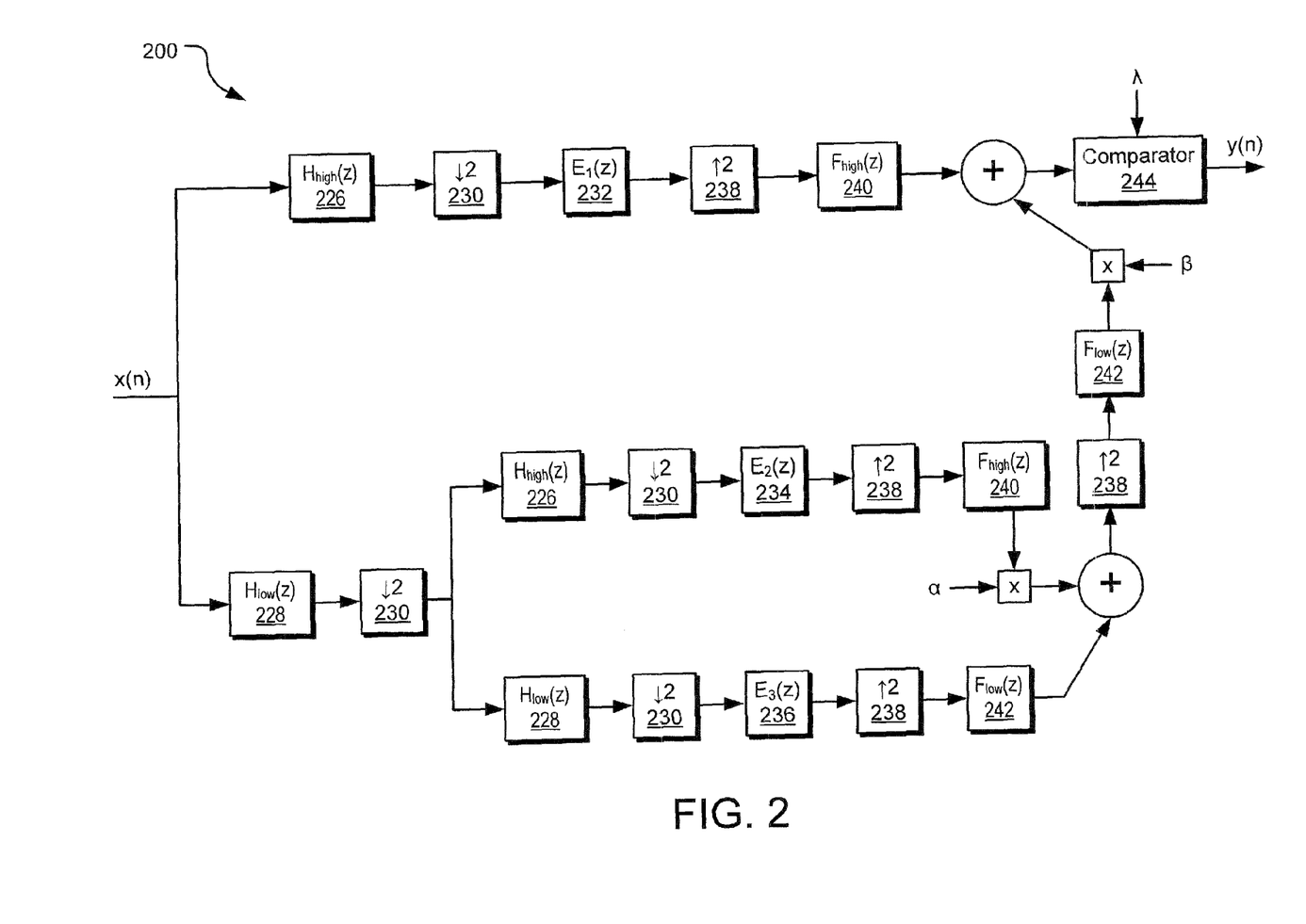
FIG. 2 is an example timing detector with three sub-band circuit branches.

FIG. 2 is an example timing detector 200 with three sub-band circuit branches. The timing detector 200 operates using discrete-time filter bank theory (also referred to as wavelet theory). In order to detect bits within an input signal x(n) oscillating at various frequencies, analysis filters $H_{high}(z)$, $H_{low}(z)$ are applied to the input signal x(n) to identify the bits oscillating at those frequencies. In one implementation, $H_{high}(z)$ is a high-pass filter, thus it detects bits modulating at frequencies above a threshold level. $H_{low}(z)$ is a low-pass filter, thus it detects bits modulating at frequencies below the threshold level. In other implementations, one or more of the filters $H_{high}(z)$, $H_{low}(z)$ is a band-pass filter, thus it detects bits modulating at frequencies between two threshold levels.

In implementations where the filters $H_{high}(z)$, $H_{low}(z)$ are high-pass and low-pass finite impulse response (FIR) filters, the input signal may be decomposed into a high-frequency sub-band and a low-frequency sub-band. Each sub-band has half the bandwidth of the original input signal. In other implementations, the sub-bands attributable to the high-pass and low-pass finite impulse response (FIR) filters overlap. So long as sub-bands attributable the filters $H_{high}(z)$, $H_{low}(z)$ are not completely identical, the sub-bands are different. Other analysis filter designs are contemplated herein that further improve timing detector 200 performance.

Downsampling blocks 230 remove every other bit from signals exiting the analysis filters $H_{high}(z)$, $H_{low}(z)$. Upsampling blocks 238 insert zeros between every sample bit to compensate for the bits dropped by the downsampling blocks 230. In other implementations, the downsampling blocks 230 may remove greater or fewer bits than every other bit and the upsampling blocks 238 may insert greater or fewer zeros between every sampled bit. The following equations relate the input (I) and output (O) signals of the downsampling blocks 230 and upsampling blocks 238 in a z-transform domain.

$$O_{downsample} = \frac{1}{2}\left[I_{downsample}(\sqrt{z}) + I_{downsample}(-\sqrt{z})\right]$$

$$O_{upsample} = I_{upsample}(z^2)$$

The FIR filtering and downsampling operations carried out by the filters $H_{high}(z)$, $H_{low}(z)$ and downsampling blocks 230 may be implemented separately as shown in FIG. 2. Alternatively, a polyphase filter structure can implement the FIR filtering and downsampling operations together.

Equalizer blocks $E_1(z)$, $E_2(z)$, and $E_3(z)$ are filters with equalizer functionalities that adjust a shape of their input signals at each sub-band. The shape of input signals into each of equalizer blocks $E_1(z)$, $E_2(z)$, and $E_3(z)$ are adjusted so that the signal output shape from each of equalizer blocks $E_1(z)$, $E_2(z)$, and $E_3(z)$ match closely with a predetermined shape chosen for each sub-band. In some implementations, the predetermined shapes chosen for each sub-band are equal or nearly equal. Equalization can improve performance of the timing detector 200 by decreasing inter-symbol interference (ISI). ISI is a form of distortion in a signal in which one symbol interferes with adjacent symbols. The effects of ISI are similar to noise, thus reducing the reliability of the signal. Equalization can reduce multipath propagation. Design of the Equalizer blocks $E_1(z)$, $E_2(z)$, and $E_3(z)$ is discussed with more specificity with regard to FIGS. 3-5 below.

Synthesis filters $F_{high}(z)$, $F_{low}(z)$ reconstruct the original input signal from the high-frequency and low-frequency sub-bands using high-pass and low-pass FIR filters. The upsampling and FIR filtering operations carried out by the upsampling blocks 238 and filters $F_{high}(z)$, $F_{low}(z)$ and may be implemented separately as shown in FIG. 2. Alternatively, a polyphase filter structure can implement the upsampling and FIR filtering operations together. Other synthesis filter designs are contemplated herein that further improve timing detector 200 performance. Combination of two or more sub-bands of the original input signal can be performed by a combiner circuit, which may include the synthesis filters $F_{high}(z)$, $F_{low}(z)$.

The analysis filters $H_{high}(z)$, $H_{low}(z)$ and synthesis filters $F_{high}(z)$, $F_{low}(z)$ may be designed using any scheme that effectively separates the input signal into sub-bands and recombines the sub-bands back into a signal related or equivalent to the input signal. In one example implementation, filter $H_{high}(z)$ is an FIR with order N according to the following equation.

$$H_{high}(z) = h(0) + h(1)z^{-1} + \ldots + h(N)z^{-N}$$

$H_{high}(z)$ is defined through $h_{low}(n)$ which is chosen using the following equation.

$$h_{low}(n) = (-1)^n h(N-n)$$

Synthesis filters $F_{high}(z)$, $F_{low}(z)$ that correspond to the analysis filters $H_{high}(z)$, $H_{low}(z)$ chosen above may be defined through $f_{high}(n)$ and $f_{low}(n)$ which are chosen using the following equations.

$$f_{high}(n) = h_{high}(N-n)$$

$$f_{low}(n) = (-1)^n h_{high}(n)$$

A third order example implementation of the aforementioned example FIR filter $H_{high}(z)$ is defined by constraining $H_{high}(z)$ to be smooth by defining its derivatives to equal zero. As a result, the following four-tap filters may be used.

$$h(0) = \frac{1-\sqrt{3}}{4\sqrt{2}}$$

$$h(1) = \frac{3-\sqrt{3}}{4\sqrt{2}}$$

-continued $$h(2) = \frac{3+\sqrt{3}}{4\sqrt{2}}$$

$$h(3) = \frac{1+\sqrt{3}}{4\sqrt{2}}$$

Referring specifically to FIG. 2, a high-pass FIR filter $H_{high}(z)$ 226 and a low-pass FIR filter $H_{low}(z)$ 228 divides an input signal x(n) into a high-frequency sub-band and a low-frequency sub-band, respectively. Each sub-band has half the bandwidth of the original input signal. In other implementations, each sub-band may have greater than half the bandwidth or less than half the bandwidth. Downsampling blocks 230 remove every other sampled bit in each of the sub-bands. An equalizer block $E_1(z)$ 232 re-shapes the high-frequency sub-band.

With regard to the low-frequency sub-band, the high-pass FIR filter $H_{high}(z)$ 226 and the low-pass FIR filter $H_{low}(z)$ 228 are applied again to split the low-frequency sub-band into a high-low-frequency sub-band and a low-low-frequency sub-band, respectively. Each additional sub-band has half the bandwidth of the low-frequency sub-band. Downsampling blocks 230 remove every other sampled bit in each of the additional sub-bands. An equalizer block $F_2(z)$ 234 re-shapes the high-low-frequency sub-band and an equalizer block $E_3(z)$ 236 re-shapes the low-low-frequency sub-band.

Upsampling blocks 238 insert zeros between every sample bit in the high-low-frequency sub-band and the low-low frequency sub-band to compensate for the bits dropped by the downsampling blocks 230. A high-pass synthesis filter $F_{high}(z)$ 240 and a low-pass synthesis filter $F_{low}(z)$ 242 are used to reconstruct a modified low-frequency sub-band from the high-low-frequency sub-band and the low-low-frequency sub-band, respectively.

Upsampling blocks 238 insert zeros between every sample bit in the high-frequency sub-band and the reconstructed low frequency sub-band to compensate for the bits dropped by the downsampling blocks 230. The high-pass synthesis filter $F_{high}(z)$ 240 and the low-pass synthesis filter $F_{low}(z)$ 242 are used to combine the high-frequency sub-band and the reconstructed low-frequency sub-band. The signal output from $F_{high}(z)$ 240 and $F_{low}(z)$ 242 may be related to the original input signal x(n) or identical to the original input signal x(n).

In one implementation, if one or more sub-bands of the input signal x(n) have a very small signal content and/or a very large disturbance ratio (e.g., high noise and/or distortion), the sub-band may be disregarded because it is unlikely that a significant quantity of useful information is contained within that sub-band.

Further, scaling factors α and β may be applied to either or both of the synthesis filters $F_{high}(z)$ 240, $F_{low}(z)$ 242 to correct for signal and disturbance variations in the sub-bands. Scaling factors α and β are discussed in more detail after FIGS. 4-6.

A comparator 244 utilizes a threshold confidence factor λ to eliminate sampled bits within a combined circuit signal that have a magnitude less than the threshold confidence factor λ. The comparator 244 assigns a common magnitude to sampled bits that meet a condition (i.e., reliable bits). The condition may be meeting or exceeding the threshold confidence factor λ. For example, the comparator 244 can assign a magnitude of 1 to sampled bits that are greater than λ, −1 to sampled bits that are less than −λ, and 0 to sampled bits that are between λ and −λ. Sampled bits that meet or exceed the threshold confidence factor λ may be referred to as "reliable bits." Further, bits that are assigned a common magnitude (e.g., 1 and −1) may be referred to as "trigger bits." Other comparator 244 conditions are contemplated herein.

While the threshold confidence factor λ reduces the quantity of bits within the combined circuit signal, the bit error rate within the combined circuit signal is improved because bits that are allowed to pass through the comparator 244 are more reliable than bits that are not allowed to pass through the comparator 244.

While conventional timing recovery circuitry attempts to use all the bits within the read-channel architecture for timing recovery, the timing recovery circuitry according to the presently disclosed technology utilizes non-zero bits that are output from the timing detector 200. Since the non-zero bits output from the timing detector 200 are more reliable than bits that are assigned a zero magnitude by the comparator 244, the BER of the timing recovery circuitry according to the presently disclosed technology is significantly lower than conventional timing recovery circuitry applied to the same read-channel architecture.

The number of non-zero bits within the signal output from the timing detector 200 is a function of the threshold confidence factor λ. The threshold confidence factor λ may be chosen to yield a desired level of confidence or a fixed number of non-zero bits, for example. In one implementation, the threshold confidence factor λ is chosen to yield a minimum number of reliable non-zero bits to perform timing recovery. In another implementation, the threshold confidence factor λ is successively modified to output a pre-selected number of non-zero bits by feeding back a quantity of output non-zero bits into successive iterations of the timing detector 200. Other schemes for choosing the threshold confidence factor λ are contemplated herein.

In some implementations, the threshold confidence factor λ is determined by the permissible SNR within the read-channel architecture. For example, for a magnetic media with a normalized density (ND)=2, the timing detector 200 may assign a non-zero magnitude to approximately 200 bits out of 4000 bits if a 2 dB SNR is permissible. If a 12 dB SNR is permissible, approximately 600 bits out of 4000 bits are assigned a non-zero magnitude. Addition of a 10% media jitter (i.e., signal noise) does not significantly affect the number of bits assigned a non-zero magnitude.

If a 12 dB SNR is permissible, the BER of conventional timing recovery circuitry is approximately $10^{-1}$ for 4000 detected bits (i.e., 400 out of 4,000 bits on average in error). Using the timing detector 200 and corresponding timing recovery circuitry, the BER improves to $10^{-3}$ for around 600 non-zero bits (i.e., less than 1 bit out of 600 bits on average in error). The timing detector 200 locates the bits within the input signal x(n) that are relatively more reliable and detects the more reliable bits with good accuracy. While the presently disclosed timing recovery circuitry operates best with a minimum number of reliable non-zero bits (i.e., bits with the highest level of reliability), the timing recovery circuitry fails to operate at all when the number of non-zero bits is below the minimum number of bits. The minimum number of reliable non-zero bits is dependent on the number of timing errors within the detected bits.

Figure 3:
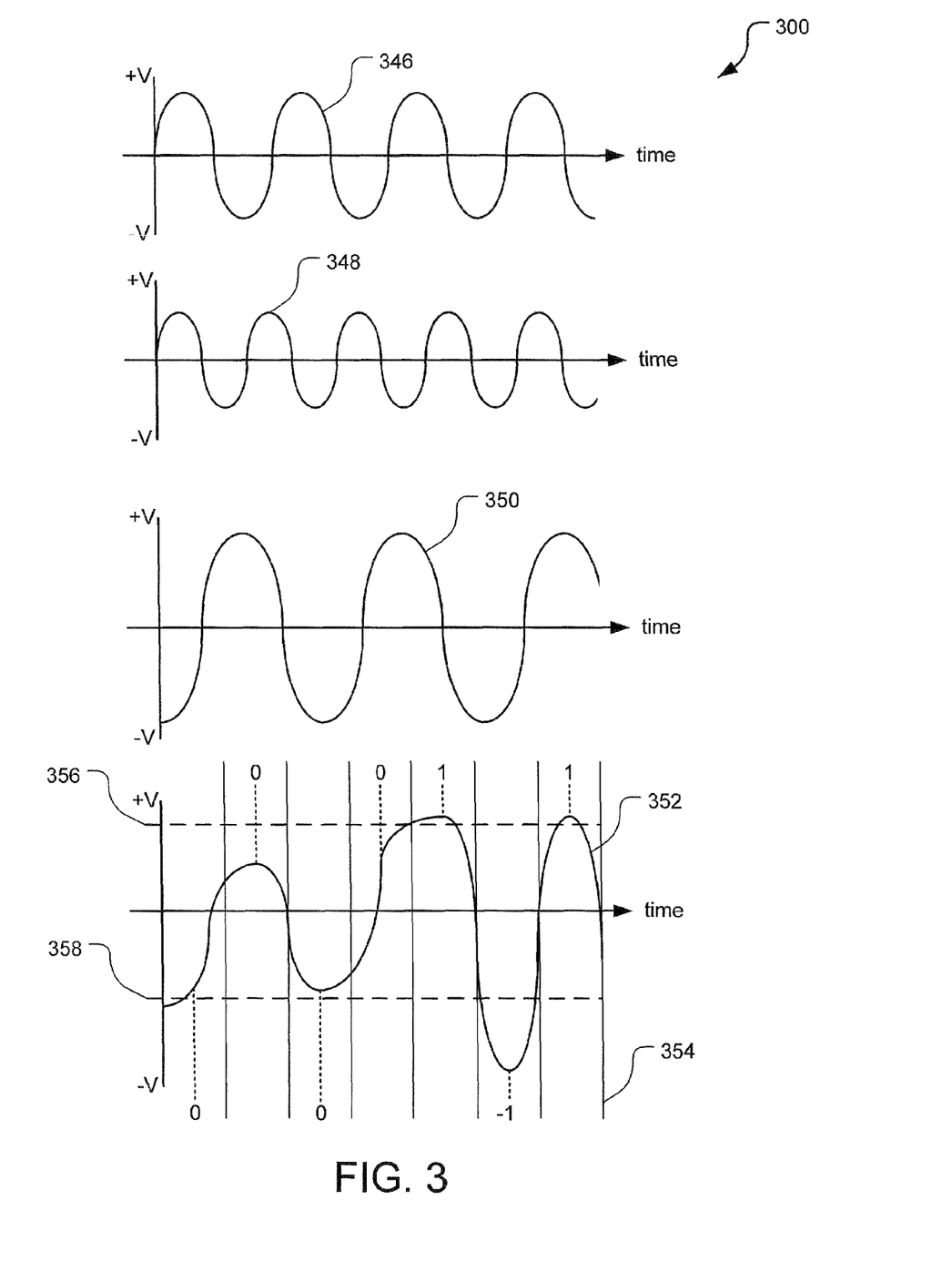
FIG. 3 is an example series of sub-band waveforms combined into an output waveform that is compared to a threshold magnitude for outputting a series of bits.

FIG. 3 is an example series of sub-band waveforms 346, 348, 350 combined into an output waveform 352 that is compared to a threshold magnitude 354 for outputting a series of bits. The sub-band waveforms 346, 348, 350 are representative of three distinct sub-bands of an input signal. Each sub-band may have a distinct frequency and/or amplitude. In the implementation shown in FIG. 3, sub-band 346 has an intermediate frequency and amplitude, sub-band 348 has a small frequency and magnitude, and sub-band 350 has a large frequency and magnitude. However, the sub-band waveforms 346, 348, 350 are mere examples of the wide array of possible waveforms that may be present in the input signal.

The sub-band waveforms 346, 348, 350 are combined into an output waveform 352 that has a frequency and amplitude that varies according to the combination of the sub-band waveforms 346, 348, 350. This combination is also referred to as summation and may include a variety of techniques of combining two or more disparate waveforms. Bit delineations (e.g., 354) are illustrated on a graph of the output waveform 352 to indicate bit spacing. Further, the graph of the output waveform 352 includes a positive magnitude threshold 356 and a negative magnitude threshold 358. In one implementation, the positive magnitude threshold 356 and negative magnitude threshold 358 are equal or related to the threshold confidence factor λ discussed with respect to FIG. 2.

Positive samples of the output waveform 352 at the center of each delineated bit that exceed the positive magnitude threshold 356 are assigned a "1" value. Negative samples of the output waveform 352 at the center of each delineated bit that exceed the negative magnitude threshold 358 are assigned a "−1" value. Samples of the output waveform 352 at the center of each delineated bit that fail to exceed either the positive magnitude threshold 356 or negative magnitude threshold 358 are assigned a "0" value. As a result, a bit series obtained by applying the positive magnitude threshold 356 and negative magnitude threshold 358 to the output waveform 352 is "0 0 0 0 1 −1 1". In one implementation, application of the positive magnitude threshold 356 and negative magnitude threshold 358 to the output waveform 352 is performed by the comparator 244 of FIG. 2.

Figure 4:
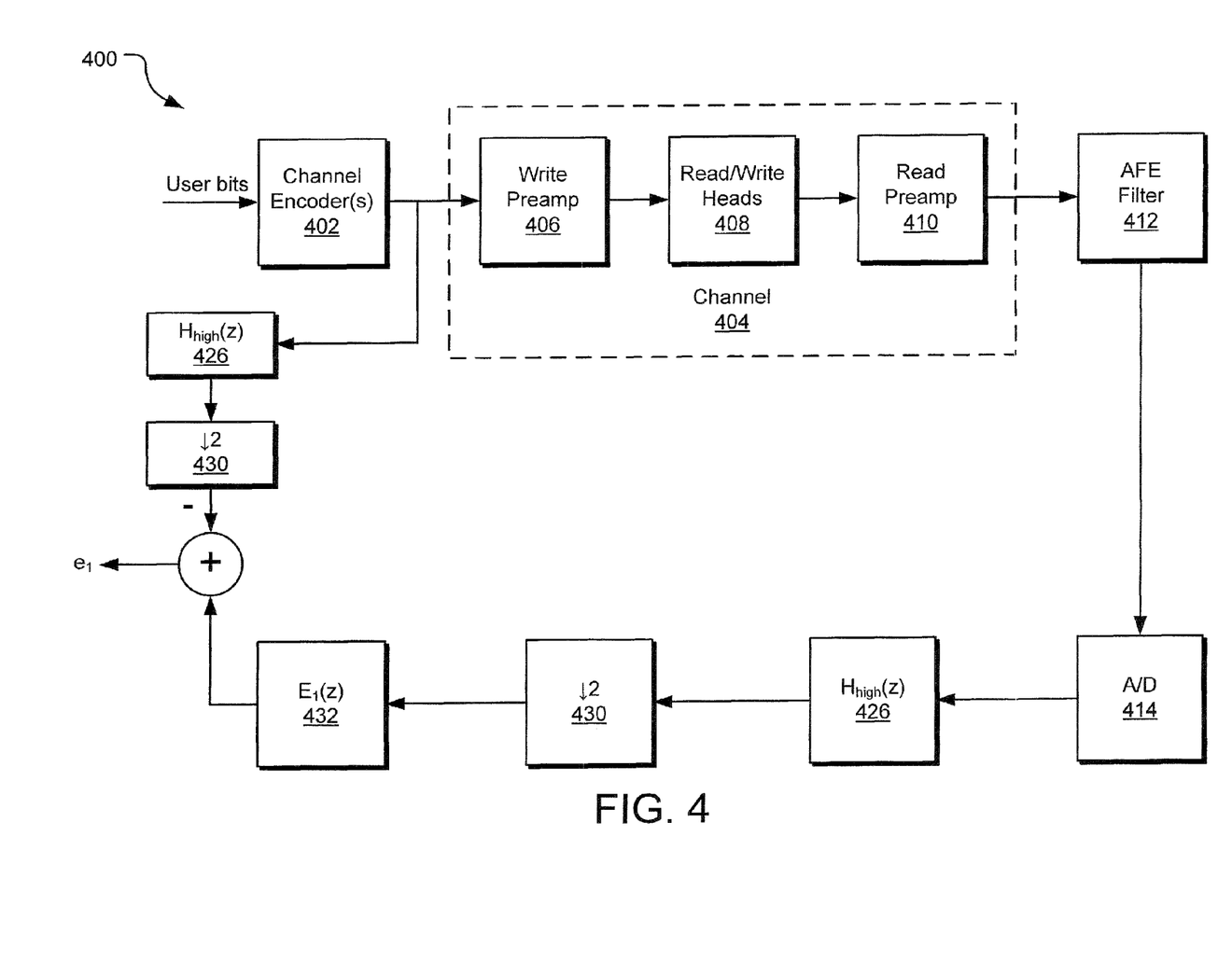
FIG. 4 is an example read-channel architecture used to design a first equalizer $E_1(z)$ for timing recovery.

FIG. 4 is an example read-channel architecture 400 used to design a first equalizer $E_1(z)$ 432 for timing recovery. The first equalizer $E_1(z)$ 432 shapes the high-frequency sub-band of FIG. 2 and is determined by minimizing an output signal $e_1$ of a read-channel architecture 400.

Similar to the read-channel architecture 100 of FIG. 1, the read-channel architecture 400 of FIG. 4 utilizes a channel encoder 402 to convert bits of data (user bits) to an encoded data stream with a format suitable to be written and read from a magnetic media disk. The encoded bits of data are then sent to a channel 404 for writing to the magnetic media and reading from the magnetic media. The channel 404 includes a write preamp 406, read and write heads 408, and a read preamp 410 as discussed with respect to FIG. 1.

An analog front end (AFE) filter 412 may then be used to filter out noise from the raw analog signal read-back from the magnetic media. The read-back signal is the fed into an A/D sampler 414 that converts the continuous read-back signal to a discrete signal. A high-pass analysis filter $H_{high}(z)$ 426 is applied to the signal output from the A/D sampler 414 to identify a first sub-band of bits modulating at high frequencies and a downsampling block 430 removes every other sampled bit in the first sub-band. Equalizer $E_1(z)$ 432 is then applied to shape the first high-frequency sub-band.

Further, a separate data path bypasses the channel 404, analog front end (AFE) filter 412, and analog to digital (A/D) sampler 414. Instead, the separate data path applies the high-pass analysis filter $H_{high}(z)$ 426 and downsampling block 430 directly to the encoded bits of data to identify a second high-frequency sub-band. The second high-frequency sub-band is subtracted from the first high-frequency sub-band to generate signal $e_1$. Equalizer $E_1(z)$ 432 may be adjusted so that the read-channel architecture 400 yields a small signal $e_1$.

Figure 5:
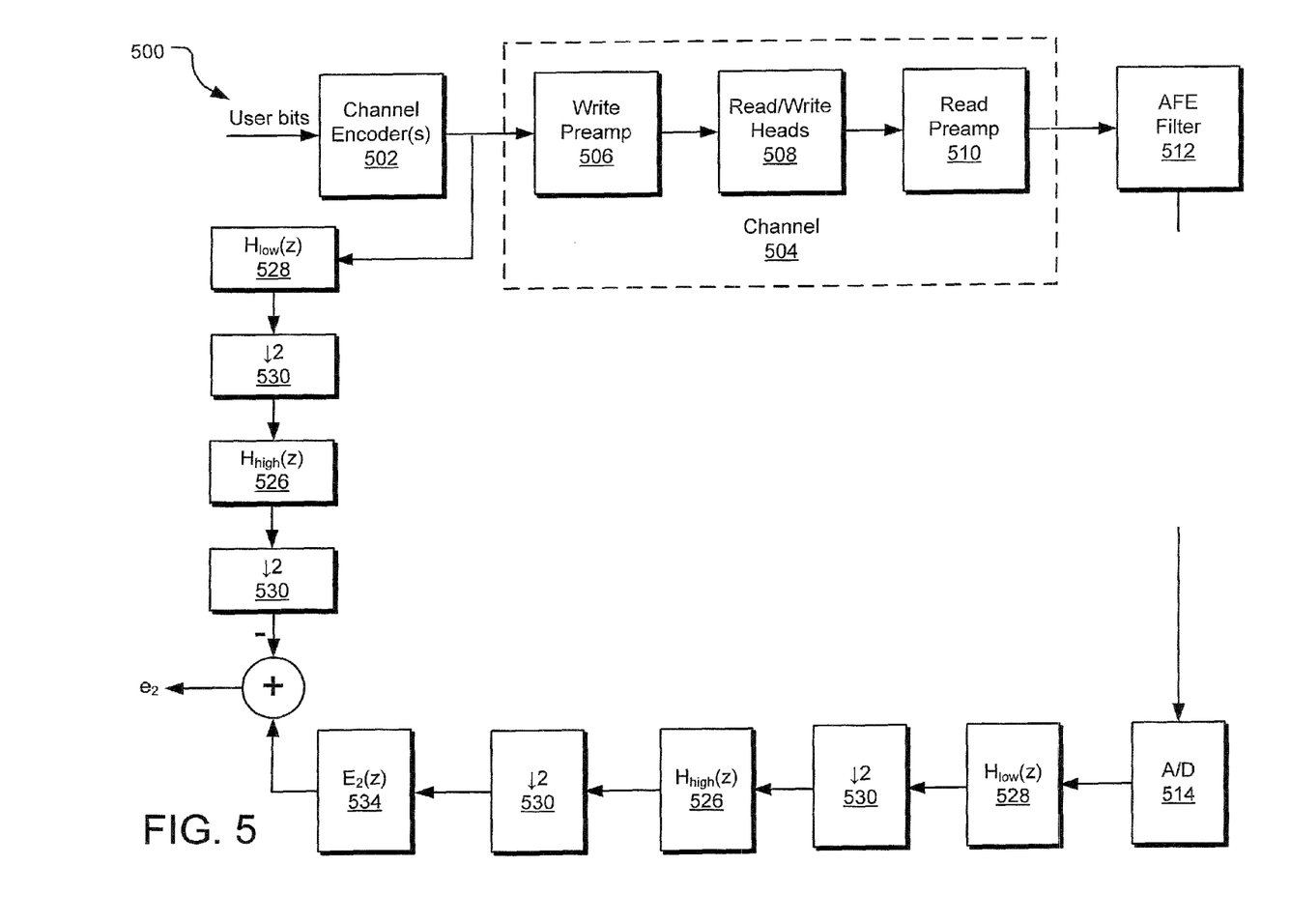
FIG. 5 is an example read-channel architecture used to design a second equalizer $E_2(z)$ for timing recovery.

FIG. 5 is an example read-channel architecture 500 used to design a second equalizer $E_2(z)$ 534 for timing recovery. The second equalizer $E_2(z)$ 534 shapes the high-low-frequency sub-band of FIG. 2 and is determined by minimizing an output signal $e_2$ of a read-channel architecture 500.

Similar to the read-channel architecture 100 of FIG. 1 and read-channel architecture 400 of FIG. 4, the read-channel architecture 500 of FIG. 5 utilizes a channel encoder 502, a channel 504, an analog front end (AFE) filter 512, and an A/D sampler 514. A low-pass analysis filter $H_{low}(z)$ 528 is applied to the signal output from the A/D sampler 514 to identify a sub-band of bits modulating at low frequencies and a downsampling block 530 removes every other sampled bit in the low-frequency sub-band. A high-pass analysis filter $H_{high}(z)$ 526 is then applied to the signal output from the low-pass analysis filter $H_{low}(z)$ 528 to identify a first high-frequency sub-band of the low-frequency sub-band. A downsampling block 530 again removes every other sampled bit in the first high-low-frequency sub-band. Equalizer $E_2(z)$ 534 is then applied to shape the first high-low-frequency sub-band.

Further, a separate data path bypasses the channel 504, AFE filter 512, and A/D sampler 514. The separate data path applies the low-pass analysis filter $H_{low}(z)$ 528 and downsampling block 530 directly to the encoded bits of data to identify and downsample a low-frequency sub-band. The high-pass analysis filter $H_{high}(z)$ 526 is then applied to the signal output from the low-pass analysis filter $H_{low}(z)$ 528 to identify a second high-frequency sub-band of the low-frequency sub-band. A downsampling block 530 again removes every other sampled bit in the second high-low frequency sub-band. The second high-low-frequency sub-band is subtracted from the first high-low-frequency sub-band to generate signal $e_2$. Equalizer $E_2(z)$ 534 may be adjusted so that the read-channel architecture 500 yields a small signal $e_2$.

Figure 6:
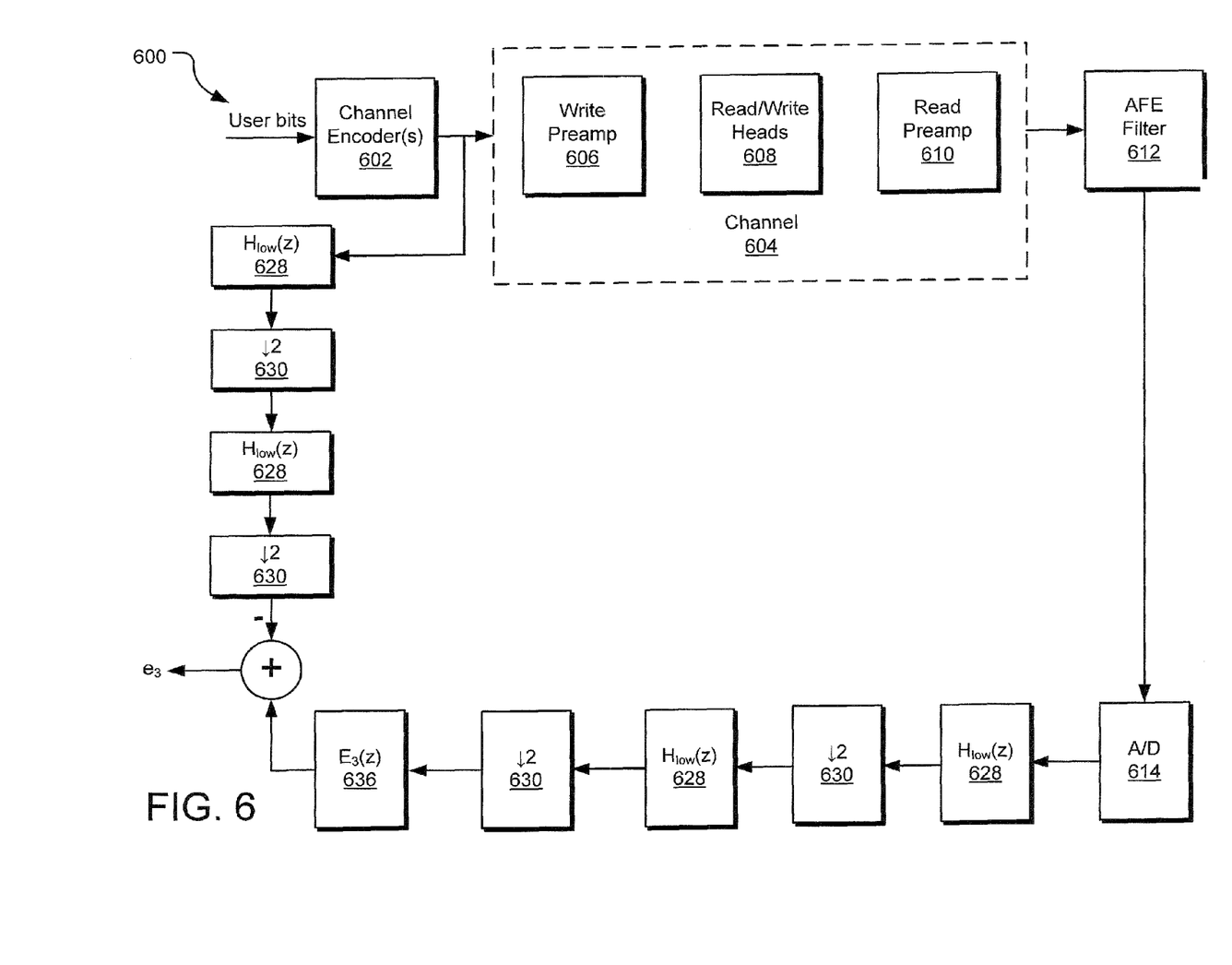
FIG. 6 is an example read-channel architecture used to design a third equalizer $E_3(z)$ for timing recovery.

FIG. 6 is an example read-channel architecture 600 used to design a third equalizer $E_3(z)$ 636 for timing recovery. The third equalizer $E_3(z)$ 636 shapes the low-low-frequency sub-band of FIG. 2 and is determined by minimizing an output signal $e_3$ of a read-channel architecture 600.

Similar to the read-channel architecture 100 of FIG. 1, read-channel architecture 400 of FIG. 4, and read-channel architecture 500 of FIG. 5, the read-channel architecture 600 of FIG. 6 utilizes a channel encoder 602, a channel 604, an analog front end (AFE) filter 612, and an A/D sampler 614. A first low-pass analysis filter $H_{low}(z)$ 628 is applied to the signal output from the A/D sampler 614 to identify a sub-band of bits modulating at low frequencies and a downsampling block 630 removes every other sampled bit in the low-frequency sub-band. An second low-pass analysis filter $H_{low}(z)$ 628 is then applied to the signal output from the first low-pass analysis filter $H_{low}(z)$ 428 to identify a first low-low-frequency sub-band of the low-frequency sub-band. A downsampling block 630 again removes every other sampled bit in the first low-low-frequency sub-band. Equalizer $E_3(z)$ 636 is then applied to shape the first low-low-frequency sub-band.

Further, a separate data path bypasses the channel 604, AFE filter 612, and A/D sampler 614. The separate data path applies the first low-pass analysis filter $H_{low}(z)$ 628 and downsampling block 630 directly to the encoded bits of data to identify and downsample a low-frequency sub-band. The second low-pass analysis filter $H_{low}(z)$ 628 is then applied to the signal output from the first low-pass analysis filter $H_{low}(z)$ 628 to identify a second low-low-frequency sub-band of the low-frequency sub-band. A downsampling block 630 again removes every other sampled bit in the second low-low-frequency sub-band. The second low-low-frequency sub-band is subtracted from the first low-low-frequency sub-band to generate signal $e_3$. Equalizer $E_3(z)$ 636 may be adjusted so that the read-channel architecture 600 yields a small signal $e_3$.

In some implementations, scaling factors $\alpha$, $\beta$ are applied to one or both of the synthesis filters $F_{high}(z)$, $F_{low}(z)$ illustrated in FIG. 2 to correct for signal disturbances (e.g., signal noise and/or distortion) at different sub-bands. Application of different scaling factors $\alpha$, $\beta$ to the synthesis filters $F_{high}(z)$, $F_{low}(z)$ is referred to as unequal scaling. The scaling factors $\alpha$, $\beta$ may be defined by the following equations, wherein $\sigma_i$ (e.g., $\sigma_1$, $\sigma_2$, and $\sigma_3$) represents the standard deviation of the equalizer design signals $e_i$ (e.g., $e_1$, $e_2$, and $e_3$) of FIGS. 4-6.

$$\beta = \frac{\sigma_{e_1}}{\sigma_{e_3}}$$

$$\alpha = \frac{\sigma_{e_3}}{\sigma_{e_2}}$$

In other implementations, the scaling factors $\alpha$ and $\beta$ are set to equal one ($\alpha=\beta=1$). Application of equal scaling factors $\alpha$ and $\beta$ to the synthesis filters $F_{high}(z)$, $F_{low}(z)$ is referred to as equal scaling.

Although the design of the analysis filters $H_{high}(z)$, $H_{low}(z)$, downsampling blocks, upsampling blocks, equalizer blocks $E_1(z)$, $E_2(z)$, and $E_3(z)$, and Synthesis filters $F_{high}(z)$, $F_{low}(z)$ is specific to the 3-branch architecture shown in FIG. 2, the design can equally be applied to any filter bank architecture with two or more sub-branches. More specifically, the timing detector of FIG. 2 may be employed with N branches with N analysis and synthesis filter banks at each branch together with N downsamplers (downsampling N times, i.e., processing signals sampled every other N times) and N upsamplers (upsampling N times, i.e., inserting N zeros between signals.

Further, the read-channel architectures 400, 500, and 600 of FIGS. 4-6 are specifically for designing the equalizer blocks $E_1(z)$, $E_2(z)$, $E_3(z)$ of the read-channel architecture 100. As a result, the read-channel architectures 400, 500, and 600 of FIGS. 4-6 may vary if the read-channel architecture 100 is changed. However, using equalizer blocks $E_1(z)$ ... $E_n(z)$ to minimize variance between test signals $e_1$ ... $e_n$ remains the same.

Figure 7:
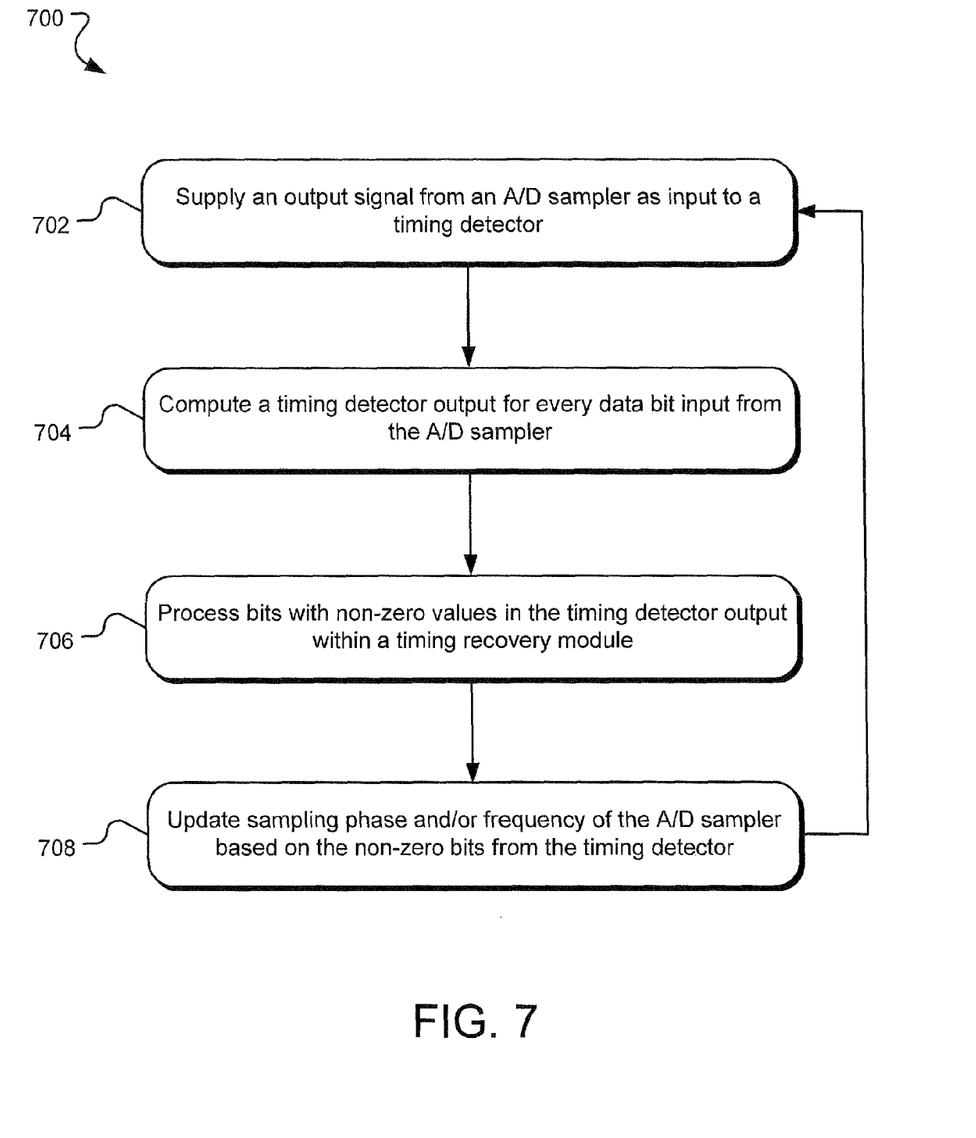
FIG. 7 illustrates example operations for performing timing recovery operations on a read-channel architecture.

FIG. 7 illustrates example operations 700 for performing timing recovery operations on a read-channel architecture. A supplying operation 702 supplies a discrete output signal from an A/D sampler as an input signal to a timing detector. Read heads read an encoded data stream from a magnetic media. A read preamp may prepare the read-back data stream for analysis by amplifying the read-back signal. An AFE filter may then filter out noise from the raw analog signal read-back from the magnetic media. The A/D sampler then converts the continuous read-back signal to a sequence of instantaneous values at discrete moments of time to yield a discrete signal. A supplying operation 702 supplies the discrete output signal from the A/D sampler as an input signal to a timing detector. The timing detector uses a simple algorithm(s) that only selects bits within the input signal that are high quality for timing recovery and discard bits that are low quality. A computing operation 704 computes an output value corresponding to each input data bit in the discrete input signal. As a result, while an output signal from the timing detector may not contain all of the bits within the input signal, the output signal may be obtained very quickly (i.e., result in a very small loop latency) and have a very high signal quality.

A processing operation 706 processes bits within a signal output from the timing detector with non-zero values within a timing recovery module. An adjusting module 708 updates the sampling phase and/or frequency of the A/D sampler based on the non-zero bits within the signal output from the timing detector. This process repeats to continuously update the sampling phase and/or frequency of the A/D sampler as bits of data are read from a storage media.

Figure 8:
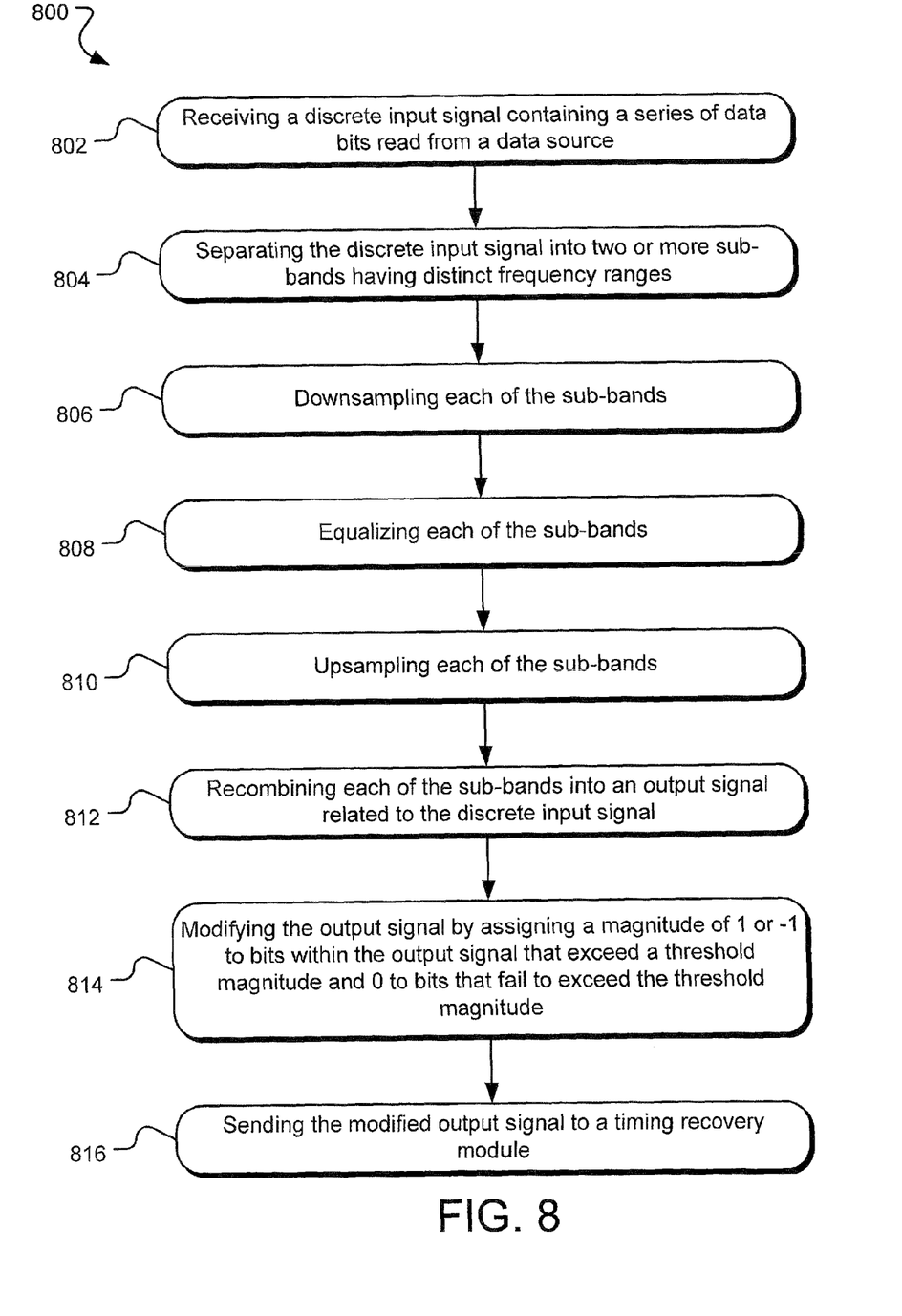
FIG. 8 illustrates example operations for selecting reliable bits for timing recovery.

FIG. 8 illustrates example operations 800 for selecting reliable bits for timing recovery. A converting operation 802 receives an analog input signal containing bits of data read from a storage media, converts the analog input signal to a sequence of instantaneous values at discrete moments of time (i.e. a discrete signal), and supplies the discrete signal to a timing detector. An analysis operation 804 uses an analysis filter bank to separate the discrete signal into two or more sub-bands, each having a distinct frequency range. Each distinct frequency ranges may have some or no overlap with other distinct frequency ranges. Each frequency range is distinct so long as it is not identical to another frequency range. More specifically, the analysis filter bank may include two or more analysis filters applied to the input signal to identify bits modulating at certain frequencies. In implementations where the analysis filters are high-pass and low-pass filters, the input signal may be decomposed into high-frequency and low-frequency sub-bands.

A downsampling operation 806 downsamples each of the sub-bands, which removes every other bit from the sub-band signal. In other implementations, the downsampling operation may remove a greater or fewer number of bits from the sub-band signals. An equalization operation 808 equalizes each of the sub-bands to minimize signal shape variance between the sub-bands. The equalization operation 808 may be accomplished using filters with equalizer functionalities that adjust a shape of their input signals at each sub-band. The shape of input signals into each of the equalization filters are adjusted so that the signal output shape from each of the equalization filters match a predetermined shape chosen for each sub-band. In some implementations, the predetermined shapes chosen for each sub-band are equal or nearly equal. Each of the sub-bands is then upsampled, which adds a zero between every bit in the signal exiting the equalizers 810. In other implementations, the upsampling operation may add a greater or fewer number of zeros depending upon the number of bits removed by the downsampling operation 806.

A recombining operation 812 recombines the sub-bands using a synthesis filter bank to create an output signal that is related, but not necessarily identical to the discrete input signal. One or more scaling factors may be applied to the synthesis filter bank to correct for signal disturbance components. A threshold operation 814 then modifies the output signal by assigning a magnitude of 1 to positive bits within the output signal that exceed a threshold magnitude, −1 to negative bits within the output signal that exceed the threshold magnitude, and 0 to bits that fail to exceed the threshold magnitude. An updating operation 816 sends the modified output signal to a timing recovery module to update the sampling phase and/or frequency of an A/D sampler.

While the presently disclosed technology is discussed with specificity regarding magnetic recording media, the described timing detector and related timing recovery circuitry can be applied to a variety of control systems in a variety of fields. Example potentially applicable fields include: molecular dynamics, ab initio calculations, astrophysics, density-matrix localization, seismic geophysics, optics, turbulence and quantum mechanics, image processing, blood-pressure monitoring, heart-rate ECG analyses, DNA analysis, protein analysis, climatology, general signal processing, speech recognition, computer graphics, multifractal analysis, data compression, and communications. With regard specifically to communications technology, specific example applications include powerline communications technology and various storage media technologies.

Figure 9:
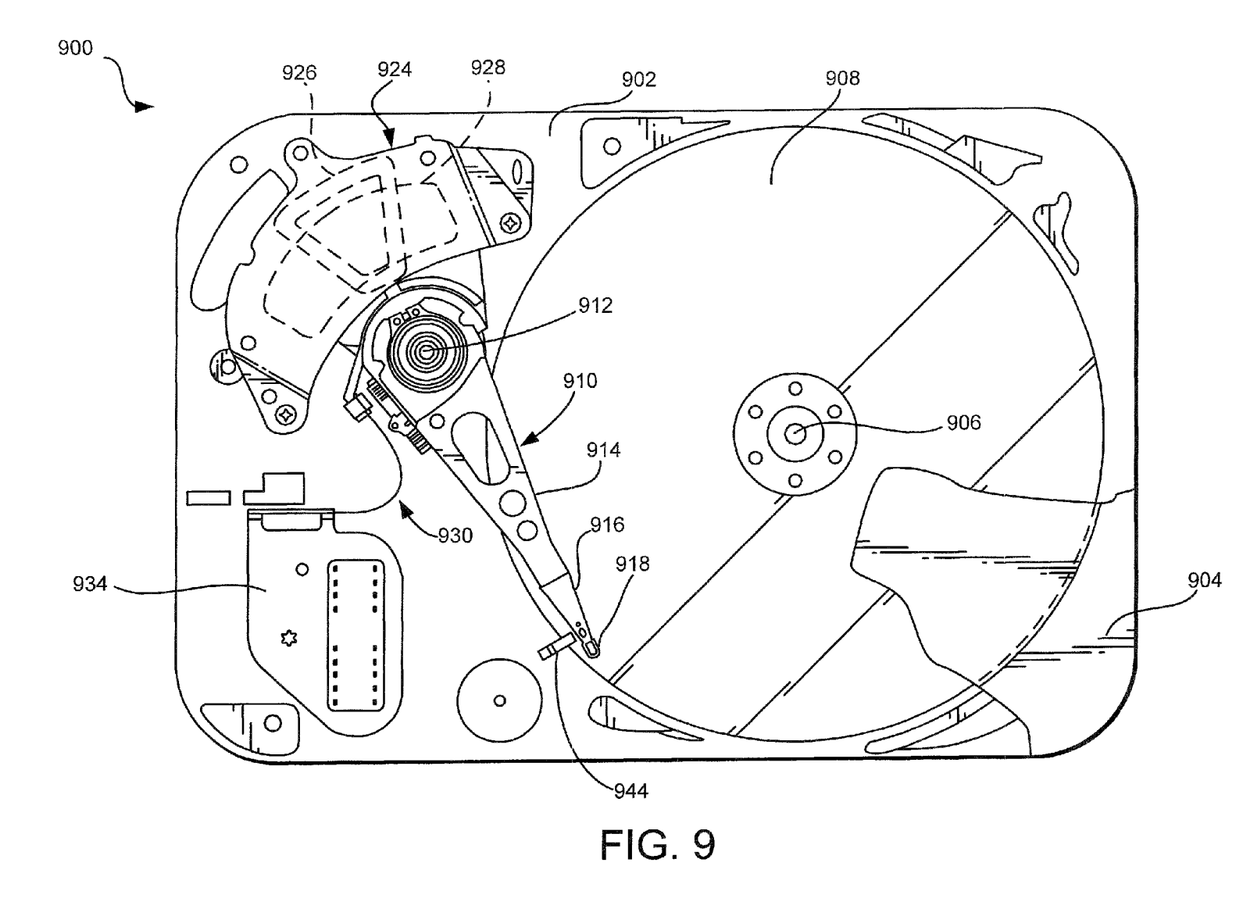
FIG. 9 illustrates a plan view of an example disc drive.

FIG. 9 illustrates a plan view of an example disc drive 900. The disc drive 900 includes a base 902 to which various components of the disc drive 900 are mounted. A top cover 904, shown partially cut away, cooperates with the base 902 to form an internal, clean environment for the disc drive in a conventional manner. The components include a spindle motor 906 that rotates one or more storage medium discs 908 at a constant high speed. Information is written to and read from tracks on the discs 908 through the use of an actuator assembly 910, which rotates during a seek operation about a bearing shaft assembly 912 positioned adjacent the discs 908. The actuator assembly 910 includes a plurality of actuator arms 914 that extend towards the discs 908, with one or more flexures 916 extending from each of the actuator arms 914. Mounted at the distal end of each of the flexures 916 is a head 918 that includes an air bearing slider enabling the head 918 to fly in close proximity above the corresponding surface of the associated disc 908. The distance between the head 918 and the storage media surface during flight is referred to as the fly height.

During a seek operation, the track position of the head 918 is controlled through the use of a voice coil motor (VCM) 924, which typically includes a coil 926 attached to the actuator assembly 910, as well as one or more permanent magnets 928 which establish a magnetic field in which the coil 926 is immersed. The controlled application of current to the coil 926 causes magnetic interaction between the permanent magnets 928 and the coil 926 so that the coil 926 moves in accordance with the well-known Lorentz relationship. As the coil 926 moves, the actuator assembly 910 pivots about the bearing shaft assembly 912 and the transducer heads 918 are caused to move across the surfaces of the discs 908.

The spindle motor 906 is typically de-energized when the disc drive 900 is not in use for extended periods of time. The transducer heads 918 are moved away from portions of the disk 908 containing data when the drive motor is de-energized. The transducer heads 918 are secured over portions of the disk not containing data through the use of an actuator latch arrangement and/or ramp assembly 944, which prevents inadvertent rotation of the actuator assembly 910 when the drive discs 908 are not spinning.

A flex assembly 930 provides the requisite electrical connection paths for the actuator assembly 910 while allowing pivotal movement of the actuator assembly 910 during operation. The flex assembly 930 includes a printed circuit board 934 to which a flex cable connected with the actuator assembly 910 and leading to the head 918 is connected. The flex cable may be routed along the actuator arms 914 and the flexures 916 to the transducer heads 918. The printed circuit board 934 typically includes circuitry for controlling the write currents applied to the transducer heads 918 during a write operation, a preamplifier for amplifying read signals generated by the transducer heads 918 during a read operation, and a power supply to a head heater, which allows fine head to disk clearance control by setting the head temperature near the active head elements. The flex assembly 930 terminates at a flex bracket for communication through the base deck 902 to a disc drive printed circuit board (not shown) mounted to the bottom side of the disc drive 900.

The user bits of FIG. 1 are written to the storage medium discs 908 and read from the storage medium discs 908 via the transducer heads 918. The timing detector 122 and timing recovery modules of FIG. 1 are either firmware incorporated as part of the printed circuit board 934 or off-disk software communicates with the printed circuit board 934 or some combination of firmware and off-disk software.

The implementations of the presently disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the presently disclosed technology. Accordingly, the logical operations making up the implementations of the presently disclosed technology described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations of the presently disclosed technology. Since many implementations of the presently disclosed technology can be made without departing from the spirit and scope of the presently disclosed technology, the presently disclosed technology resides in the claims hereinafter appended. Furthermore, structural features of the different implementations may be combined in yet another implementation without departing from the recited claims.

What is claimed is:

1. A method comprising:
   generating a trigger bit when a summation of two or more sub-bands of a divided digital signal satisfies a condition that indicates a reliable bit of the digital signal; and
   performing timing recovery using the generated trigger bit.

2. The method of claim 1, wherein each sub-band of the two or more sub-bands is carried on a sub-band circuit branch that includes an equalizer tuned to a distinct band of a bit frequency on the digital signal.

3. The method of claim 1, wherein the digital signal is an output from a read-channel.

4. The method of claim 1, wherein the condition is a magnitude of the summation of the two or more sub-bands that exceeds a threshold.

5. The method of claim 1, wherein each sub-band of the two or more sub-bands is carried on a sub-band circuit branch that is tuned to a different band of a bit frequency on the digital signal and a combination of the sub-bands is modified by assigning a zero value to bits that do not meet the condition.

6. The method of claim 1, further comprising:
   assigning a first value to positive bits of the digital signal that satisfy the condition;
   assigning a second value to negative bits of the digital signal that satisfy the condition;
   assigning a zero value to bits of the digital signal that do not satisfy the condition; and
   adjusting a read-channel based on the assigned values of the digital signal.

7. The method of claim 1, wherein the two or more sub-bands are defined by two or more filters.

8. The method of claim 1, wherein one or more sub-bands are scaled by a distinct scaling factor that corrects for signal disturbances.

9. A bit detector circuit comprising:
   two or more sub-band circuit branches, each sub-band circuit branch configured to carry a distinct sub-band of a digital output of a read-channel; and
   a comparator coupled to receive each of the two or more sub-band circuit branches and configured to output a trigger bit when a summation of the distinct sub-bands satisfies a condition that indicates a reliable bit of the digital output, wherein the trigger bit is used to perform timing recovery.

10. The bit detector circuit of claim 9, wherein each sub-band circuit branch includes an equalizer tuned to a distinct band of a bit frequency from the read-channel.

11. The bit detector circuit of claim 9, wherein the condition is a magnitude of the summation of the distinct sub-bands that exceeds a threshold.

12. The bit detector circuit of claim 9, wherein each sub-band is tuned to a different band of a bit frequency from the read-channel and a combination of the sub-bands is modified by assigning a zero value to bits that do not meet the condition.

13. The bit detector circuit of claim 9, wherein the comparator assigns a first value to positive bits of the digital output that meet the condition, a second value to negative bits of the digital output that meet the condition, and a zero value to bits of the digital output that do not meet the condition.

14. The bit detector circuit of claim 9, wherein the two or more sub-band branches are defined by two or more filters.

15. The bit detector circuit of claim 9, wherein one or more sub-bands are scaled by a distinct scaling factor that corrects for signal disturbances.

16. A bit detector circuit comprising:
   two or more sub-band circuit branches, each sub-band circuit branch configured to carry a distinct sub-band of a digital output of a read-channel;
   a combiner coupled to receiving the two or more sub-band circuit branches and configured to perform a summation of the two or more sub-band circuit branches and output a combined circuit signal; and
   a comparator coupled to receive the combined circuit signal and configured to output a trigger bit when the combined circuit signal satisfies a condition that indicates a reliable bit of the digital output, wherein the trigger bit is used to perform timing recovery.

17. The bit detector circuit of claim 16, wherein the condition is a magnitude of the summation of the distinct sub-bands that exceeds a threshold.

18. The bit detector circuit of claim 16, wherein each sub-band is tuned to a different band of a bit frequency from the read-channel and a combination of the sub-bands is modified by assigning a zero value to bits that do not meet the condition.

19. The bit detector circuit of claim 16, wherein the comparator assigns a first value to positive bits of the digital output that meet the condition, a second value to negative bits of the digital output that meet the condition, and a zero value to bits of the digital output that do not meet the condition.

20. The bit detector circuit of claim 16, wherein one or more sub-bands are scaled by a distinct scaling factor that corrects for signal disturbances.

\* \* \* \* \*